United States Patent

Hegner et al.

[11] Patent Number: 5,836,063
[45] Date of Patent: Nov. 17, 1998

[54] METHOD FOR PRODUCING CAPACITIVE CERAMIC ABSOLUTE PRESSURE SENSORS SORTED IN ZERO-POINT LONG-TERM STABILITY DEFECT CLASSES

[75] Inventors: Frank Hegner; Lukas Klausmann, both of Lörrach, Germany

[73] Assignee: ENVEC Mess- und Regeltechnik Gmbh + Co., Weil am Rhein, Germany

[21] Appl. No.: 811,708

[22] Filed: Mar. 5, 1997

[30] Foreign Application Priority Data

Mar. 23, 1996 [EP] European Pat. Off. .............. 96104655

[51] Int. Cl.$^6$ ....................................................... H01G 7/00
[52] U.S. Cl. ................................ 29/25.42; 73/718; 73/724
[58] Field of Search ............................ 29/25.42; 73/718, 73/724

[56] References Cited

U.S. PATENT DOCUMENTS 4,369,661  1/1983  Gibb .
5,001,595  3/1991  Dittrich et al. .

*Primary Examiner*—Timothy V. Eley
*Assistant Examiner*—Benjamin M. Halpern
*Attorney, Agent, or Firm*—Bose McKinney & Evans

[57] ABSTRACT

In this method for producing capacitive alumina-ceramic absolute pressure sensors sorted in high-precision zero-point long-term stability defect classes referred to a measured-value span $c_{sp}$, the sensors are firstly produced conventionally: a substrate is provided with an annular first electrode and, at the center, a circular second electrode insulated from the first; a diaphragm is provided with a third electrode, and the substrate and diaphragm are joined tightly together in a vacuum by the mutually facing electrodes, at an outer edge through the interposition of an active brazing ring with the formation of a chamber, with the result that a pressure-dependent capacitance $C_p$ and a pressure-independent capacitance $C_r$ are produced. Then, using the equation $c=(C_p-C_r)/C_p=k_1(p-p_0)+k_0$, at room temperature and under a vacuum ($=p\rightarrow 0$) a first zero value $c_{n1}=-k_1p_0+k_0$ is determined by means of a capacitance zero-point measuring device having the zero-point measuring error $F_n$. A second zero value $c_{n2}=-k_1p_0'+k_0$ is determined for each sensor by means of the same measuring device after the sensors have been stored in a gas during a period t in such a way that the pressure and/or temperature of the gas was raised, or its molecular weight was lowered, with respect to normal atmospheric conditions. Then the difference $\delta c_n$ between the first and second zero values $\delta c_n=c_{n1}-c_{n2}=-k_1\delta p_0$ is formed, and the value $\delta c_n/c_{sp}$ is compared with the value $F_n/c_{sp}$. It is also possible to make use analogously of the zero-point temperature coefficient.

8 Claims, 1 Drawing Sheet

METHOD FOR PRODUCING CAPACITIVE CERAMIC ABSOLUTE PRESSURE SENSORS SORTED IN ZERO-POINT LONG-TERM STABILITY DEFECT CLASSES

FIELD of the INVENTION

The present invention relates to a method for producing capacitive alumina-ceramic absolute pressure sensors sorted in zero-point long-term stability defect classes.

BACKGROUND of the INVENTION

U.S. Pat. No. 5,001,595 describes a method for producing capacitive alumina-ceramic pressure sensors which comprises the following steps:

a disk-shaped alumina-ceramic substrate is provided on a surface in the vicinity of its edge with an annular first metal layer, serving as a first electrode, and at the center of the surface with a circular second metal layer, serving as a second electrode, which electrodes are insulated from one another, an alumina-ceramic diaphragm is provided on a surface with a further metal layer, serving as a third electrode, the three electrodes are provided with external terminals, the substrate and diaphragm are joined tightly together by the mutually facing surfaces carrying the electrodes, at an outer edge in each case, through the interposition of an active brazing ring with the formation of a chamber, the result being to produce, in conjunction with the action of an external pressure p on the pressure sensor, a virtually pressure-independent reference capacitance $C_r$ between the first and third electrodes and a pressure-dependent capacitance $C_p$ between the second and third electrodes, It is conventional for the substrate and diaphragm either to be joined tightly together in a vacuum by means of the active brazing ring, or firstly to be joined tightly together in an inert gas, and thereafter to evacuate the chamber and seal it tightly if it is intended to produce absolute pressure sensors by means of the method described above. A pressure value $p_0$ conventional in practice for this vacuum is, for example, $p_0 = 3 \cdot 10^{-4}$ Pa ($= 3 \cdot 10^{-6}$ mbar).

There exists the following problematic situation in the case of such absolute pressure sensors as regards the values to be specified for the long-term stability of their respective capacitive zero-point, which is to be guaranteed by the producer:

Since the zero-point varies with variation in the slight internal pressure prevailing in the interior of the absolute pressure sensor and caused by the vacuum generated during its production, such variations occur whenever the absolute pressure sensor is leaky for reasons of material and/or production, that is to say when the internal pressure rises, even over a long time and slowly.

Thus, for example, with an absolute pressure sensor designed for a nominal pressure of $2 \cdot 10^4$ Pa ($=200$ mbar) a leakiness with a leakage rate of $1.6 \cdot 10^{-11}$ Pa·l/s ($=1.6 \cdot 10^{-13}$ mbar·l/s) leads to a zero-point drift of 0.1%/a referred to the measured-value span of the absolute pressure sensor; see below for the definition of the measured-value span.

The abovementioned rise in the internal pressure is thus at the same time an indication and a measure on the one hand of the leakiness of the absolute pressure sensor, and on the other hand of the corresponding variation in the value initially determinable after production, that is to say the original value, of the zero-point.

As has been discovered by the inventors, with the rise in the internal pressure there is a variation not only in the zero-point, but also in the temperature coefficient of the latter, with the result that said temperature coefficient can also serve to determine the long-term stability of the zero-point.

It is therefore possible according to the findings of the inventors to determine the long-term stability of the zero-point either by measuring at least two values of the zero-point or at least two values of the temperature coefficient, specifically of the abovementioned respective original value, on the one hand, and of a respective later value, and by comparing these two respective values. However, a sufficient waiting time must pass until the determination of the later value in order to be able at all to measure a deviation of the later value from the original one.

Thus, in the case of a zero-point long-term stability of the order of, for example, 0.1%/a to be guaranteed, it would be necessary in theory to wait at least one year ($=1$ a) until it is possible to measure a zero-point drift of 0.1%; in practice, it is even several years, since it must be possible to distinguish this drift measured value sufficiently from the measurement uncertainty of the measuring device. However, this is not acceptable from currently rational production with as low as possible a proportion of production for store ("lean production").

It is therefore not enough to produce the ceramic absolute pressure sensors physically in the conventional fashion described above, since in this form their characteristics, and thus their accuracy, which is to be guaranteed, are still unknown; they are therefore not yet marketable in this form. Rather, their production as a marketable product also requires determination of the long-term stability and sorting in long-term stability classes.

SUMMARY of the INVENTION

It is therefore an object of the invention to specify methods for producing marketable ceramic absolute pressure sensors which are completed in the sense explained.

For this purpose, a first variant of the invention consists in a method for producing capacitive alumina-ceramic absolute pressure sensors sorted in high-precision zero-point long-term stability defect classes referred to a measured-value span, which comprises the following steps:

a disk-shaped substrate is provided on a surface in the vicinity of its edge with an annular first metal layer, serving as a first electrode, and at the center of the surface with a circular second metal layer, serving as a second electrode, which electrodes are insulated from one another, a diaphragm is provided on a surface with a further metal layer, serving as a third electrode, the three electrodes are provided with external terminals, either the substrate and diaphragm are joined tightly together in a vacuum by the mutually facing surfaces carrying the electrodes, at an outer edge in each case, through the interposition of an active brazing ring with the formation of a chamber or the substrate and diaphragm are joined tightly together in an inert gas by the mutually facing surfaces carrying the electrodes, at an outer edge in each case, through the interposition of an active brazing ring with the formation of a chamber and the chamber is thereafter evacuated, the result being to produce, in conjunction with the action of an external pressure p on the absolute pressure sensor, a virtually pressure-independent reference capacitance $C_r$ between the first and third electrodes and a pressure-dependent capacitance $C_p$ between the second and third electrodes, at a first temperature value prescribable by the user, in particular at room temperature, and under a vacuum, corresponding to $p \to 0$, with the aid of the equation $c=(c_p-C_r)/C_p=k_1(p-p_0)+k_0$, wherein $p_0$ is the pressure of the vacuum present in the interior of the chamber and $k_0$, $k_1$ are sensor-specific constants, a first zero value $c_{n1}=-k_1p_0+k_0$ is determined for each absolute pressure sensor by means of a high-precision capacitance zero-point measuring device which has a guaranteed zero-point measuring error $F_n$, a second zero value $c_{n2}=-k_1p_0'+k_0$ is determined for each absolute pressure sensor by means of the same capacitance zero-point measuring device, after the absolute pressure sensors have been stored during a period t in a gas in such a way that
either the pressure and/or the temperature of said gas was raised with respect to normal atmospheric conditions, i.e. room temperature, air and the normal pressure thereof, or said gas was replaced by another gas with a lower molecular weight, the difference $\delta c_n$ between the first and second zero values $\delta c_n = c_{n1} - c_{n2} = -k_1(p_0+p_0') = -k_1\delta p_0$ is formed, the value $\delta c_n/c_{sp}$ being the difference $\delta c_n = -k_1\delta p_0$ divided by the measured-value span $c_{sp}$ of each absolute pressure sensor is formed and compared with the value $F_n/c_{sp}$ being said zero-point measuring error $F_n$ divided by the measured-value span $c_{sp}$, and the zero-point long-term stability defect classes are formed with the aid of a minimum value prescribable by the user with a safety clearance above said value $F_n/c_{sp}$.

Furthermore a second variant of the invention consists in a method for producing capacitive alumina-ceramic absolute pressure sensors sorted in high-precision zero-point long-term stability defect classes referred to a measured-value span, which comprises the following steps:

a disk-shaped substrate is provided on a surface in the vicinity of its edge with an annular first metal layer, serving as a first electrode, and at the center of the surface with a circular second metal layer, serving as a second electrode,
which electrodes are insulated from one another,
a diaphragm is provided on a surface with a further metal layer, serving as a third electrode,
the three electrodes are provided with external terminals,
either the substrate and diaphragm are joined tightly together in a vacuum by the mutually facing surfaces carrying the electrodes, at an outer edge in each case, through the interposition of an active brazing ring with the formation of a chamber
or the substrate and diaphragm are joined tightly together in an inert gas by the mutually facing surfaces carrying the electrodes, at an outer edge in each case, through the interposition of an active brazing ring with the formation of a chamber and the chamber is thereafter evacuated,
the result being to produce, in conjunction with the action of an external pressure p on the absolute pressure sensor, a virtually pressure-independent reference capacitance $C_r$ between the first and third electrodes and a pressure-dependent capacitance $C_p$ between the second and third electrodes, whose pressure-dependent capacitance ratio is $c=(c_p-C_r)/C_p=k_1(p-p_0)+k_0$, wherein $p_0$ is the pressure of the vacuum present in the interior of the chamber and $k_0$, $k_1$ are sensor-specific constants, at least two different temperatures $T_1$, $T_2$ prescribable by the user, of which one is the room temperature, in particular, and under a vacuum, corresponding to $p \to 0$, a first value $Tk_{c1}$ of the temperature coefficient $Tk_c$ of the zero-point is determined with the aid of the equation $Tk_{c1}=(C_{p2} \cdot C_{r1} - C_{p1} \cdot C_{r2})/\{C_{p2} \cdot C_{p1}(T_2-T_1)\}_{p=p0}$ for each absolute pressure sensor by means of a high-precision capacitance zero-point temperature coefficient measuring device, which has a guaranteed temperature coefficient measuring error $F_T$, a second value $Tk_{c2}$ of the temperature coefficient $Tk_c$ of the zero-point is determined with the aid of the equation $$Tk_{c2}=(C_{p2} \cdot C_{r1} - C_{p1} \cdot C_{r2})/\{C_{p2} \cdot C_{p1}(T_2-T_1)\}_{p=p0},$$

for
each absolute pressure sensor by means of the same capacitance zero-point temperature coefficient measuring device and at the same temperature values $T_1$, $T_2$,
after the absolute pressure sensors have been stored during a period t in a gas in such a way that
either the pressure and/or the temperature of said gas was raised with respect to normal atmospheric conditions, i.e. room temperature, air and the normal pressure thereof, or said gas was replaced by another gas with a lower molecular weight,
the difference $\delta Tk_c$ between the first and second values of the temperature coefficient $\delta Tk_c = Tk_{c1} - Tk_{c2}$ is formed,
the value $\delta Tk_c/c_{sp}$ being the difference $\delta Tk_c = Tk_{c1} - Tk_{c2}$ divided by the measured-value span $c_{sp}$ of each absolute pressure sensor is formed and compared with the value $F_T/c_{sp}$ being said temperature coefficient measuring error $F_T$ divided by the measured-value span $c_{sp}$, and
the zero-point long-term stability defect classes are formed with the aid of a minimum value prescribable by the user with a safety clearance above said value $F_T/c_{sp}$.

According to a respective preferred embodiment of the two variants of the invention, the first and second electrodes are applied in such a way that they virtually have the same surface area.

An advantage of the invention consists in that numerical values of the long-term stability can be specified and thus guaranteed. A further advantage consists in that the waiting time mentioned above can be substantially reduced, for example to a few weeks.

DETAILED DESCRIPTION of the INVENTION

Figure 1:
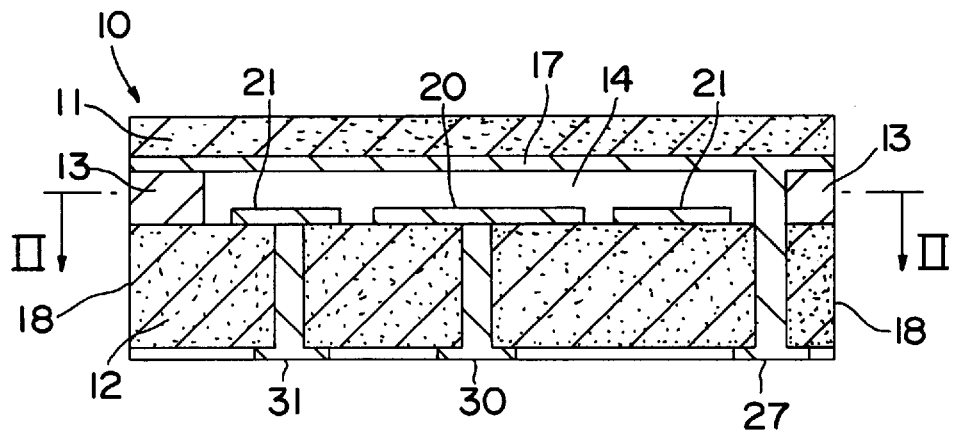
FIG. 1 is a longitudinal sectional view off an absolute pressure sensor.
Figure 2:
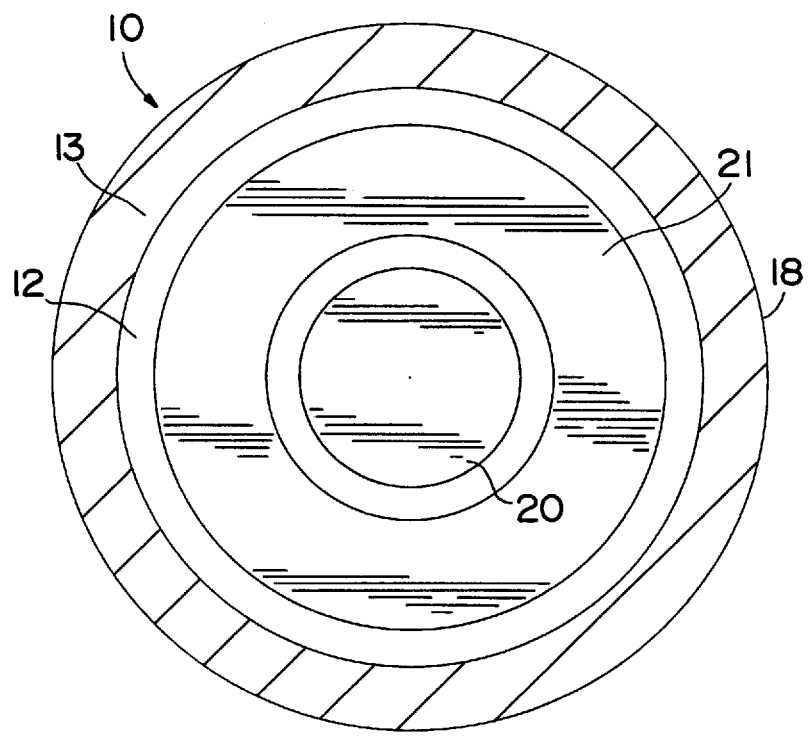
FIG. 2 is a sectional view as seen from line II—II of FIG. 1.

The two variants of the invention will now be explained in more detail with the aid of exemplary embodiments.

The two variant methods of the invention proceed from already prefabricated disk-shaped substrates and diaphragms, made in each case of alumina, in particular with a purity of 96% by weight, that is to say from ceramic substrates and ceramic diaphragms already being in the finished sintered state. The substrates and diaphragms are preferably circularly cylindrical and have the same diameter.

Furthermore, the two variant methods proceed from already prefabricated active brazing rings of corresponding diameter, which preferably consist of one of the ternary zirconium/nickel/titanium alloys such as are described in U.S. Pat. No. 5,334,344.

In order to simplify the verbal presentation, the following contains a description of the production of a single absolute pressure sensor 10 although, as usual, the method steps to be outlined proceed on a production batch of a multiplicity of absolute pressure sensors.

An annular first metal layer, serving as a first electrode 21, is applied to a surface of the substrate 12 in the vicinity of its edge 18, and a circular second metal layer, serving as a second electrode 20, is applied at the center of this surface in such a way that the two electrodes are electrically insulated from one another.

A further metal layer, serving as third electrode 17, is applied to a surface of the diaphragm 11, virtually covering it completely. The first electrode 21 is provided with a first external terminal 31, the second electrode 20 is provided with a second external terminal 30, and the third electrode 17 is provided with a third external terminal 27.

Various suitable metals can be preferably used for this purpose and various suitable methods can be applied, such as are described, for example, in U.S. Pat. No. 5,001,595, U.S. Pat. No. 5,194,697, U.S. Pat. No. 5,050,035 and in U.S. Pat. No. 5,539,611.

Either in a vacuum or in an inert gas, a substrate 12 prepared and fitted in the way explained so far and a diaphragm 11 prepared and fitted in the way explained so far are joined tightly together, that is to say fixed together, by the mutually facing surfaces carrying the electrodes, at an outer edge in each case, through the interposition of the active brazing ring 13 with the formation of a chamber 14; in the inert-gas case, the chamber 14 must further be evacuated after the fixing, and then be tightly sealed.

After these method steps, the absolute pressure sensors 10 are fabricated as electronic components, although only prima facie. Therefore it is exclusively in this sense that "finished" absolute pressure sensors are spoken of below.

The action of an external pressure p on such an absolute pressure sensor produces a virtually pressure-independent reference capacitance $C_r$ between the first electrode 21 and the third electrode 17 and a pressure-dependent capacitance $C_p$ between the second electrode 20 and the third electrode 17. Since the third electrode 17 is common to the two capacitances, a capacitance ratio $c=(C_p-C_r)/C_p$ can be evaluated by means of suitable measuring circuits such as are described in, for example, U.S. Pat. No. 5,210,501, U.S. Pat. No. 5,257,210 and U.S. Pat. No. 5,451,940.

These measuring circuits can also contain circuit elements for linearization and, for example, for temperature compensation, and are structurally integrated with the absolute pressure sensors, for example, in the form of a hybrid circuit.

It is to be emphasized that the measurements mentioned below are not such as were made by means of such measuring circuits, but are direct measurements of the capacitance ratio c made at the evacuated absolute pressure sensors by means of a high-precision capacitance zero-point measuring device which has a guaranteed capacitance zero-point measuring error $F_n$, or by means of a high-precision capacitance zero-point temperature coefficient measuring device which has a guaranteed capacitance zero-point temperature coefficient measuring error $F_T$.

According to the first variant of the invention, at a first temperature value prescribable or settable by the user, in particular at room temperature (=20° C.), and under a vacuum, that is to say p→0–which corresponds to p≈0–a first zero value $c_{n1}=-k_1p_0+k_0$ is first formed with the aid of the above equation $c=(C_p-C_r)/C_p$, which can also be written as follows: $c=k_1(p-p_0)+k_0$. In this, $P_0$ is the pressure of the vacuum present in the interior of the chamber 14, and $k_0$, $k_1$ are sensor-specific constants.

It is expedient to define a measured-value span $C_{sp}$ of the absolute pressure sensor 10 as follows:

$$c_{sp}=\{(C_p-C_r)/C_p\}_{p=pn}-\{(C_p-C_r)/C_p\}_{p=0}.$$

Expressed in words, the measured-value span $c_{sp}$ is thus the measuring range, situated between the pressure value zero and the pressure value of the nominal pressure pn, of pressure values which act on the absolute pressure sensor and are to be measured. In this case, the nominal pressure pn is the pressure value fixed by the producer, up to which acceptable functioning is guaranteed. A typical value of the measured-value span is $c_{sp}$=0.15.

If an absolute pressure sensor 10 which is "finished" in the sense defined above is leaky, its internal pressure rises more or less strongly with time, and the original vacuum worsens.

A second measurement performed after a period t by means of the same capacitance zero-point measuring device as in the case of the first measurement thus produces a second zero value $c_{n2}=-k_1p_0'+k_0$ deviating from the zero value $c_{n1}$ thereof.

The difference $\delta c_n=c_{n1}-c_{n2}=-k_1(p_0+p_0')=-k_1\delta p_0$ between these two zero values is thus a measure of the leakiness.

If, for example, it is to be possible to guarantee a zero-point long-term stability of <0.1%/a, the absolute value of the difference $\delta c_n=-k_1$ divided by the measured-value span $c_{sp}$ is permitted to be equal to at most 0.1%/a; it thus holds that: $|\delta c_n/c_{sp}|\leq 0.1\%/a$.

It is assumed that the two measurements at the abovementioned instants, specifically at the beginning and at the end of the period t, are affected by the same zero-point measuring error $F_n$ of the high-precision capacitance zero-point measuring device, and thus that the zero-point measuring error $F_n$ guaranteed by the producer of the capacitance zero-point measuring device does not vary.

This zero-point measuring error $F_n$ is, however, of the same order of magnitude as the measured term $\delta c_n/c_{sp}$; therefore, only after the time of a few years mentioned at the beginning the term $\delta c_n/c_{sp}$ has become so large that it differs measurably from the zero-point measuring error $F_n$, that is to say is at least equal to $2\cdot F_n$, for example.

The following method steps of the..first variant of the invention serve to abbreviate this excessively long time, that is to say they serve the purpose of permitting the significance of the term $\delta c_n/c_{sp}$ with respect to $F_n$ to appear at a substantially earlier instant.

For this purpose, the absolute pressure sensors are stored in a gas during a period t, for example by being enclosed in a vessel containing the gas, in such a way that either the pressure and/or the temperature of said gas was raised with respect to normal atmospheric conditions which are, for example, room temperature, air and its normal pressure, or said gas was replaced by another gas with a lower molecular weight. The variation in the internal pressure is directly proportional to the time t.

The lowering of the molecular weight with respect to that of air can be achieved by selecting hydrogen or helium as the gas in which the absolute pressure sensors are stored. Because their molecular weight is lower than that of air, the molecules reach the chamber of the absolute pressure sensors through leaky points more quickly than those of air, with the result that their vacuum worsens more quickly and, therefore the term $\delta c_n/c_{sp}$ reaches significant values more quickly. Here, the variation in the internal pressure is inversely proportional to the square root of the molecular weight M, that is to say proportional to $M^{-\frac{1}{2}}$.

The same effect results from storage at a higher temperature T than the ambient temperature, since then because of their greater mobility the molecules of the gas penetrate more quickly into leaky points and thus likewise contribute to a quicker worsening of the vacuum in the chamber, attended by the consequences thereof. Here, the variation in the internal pressure is proportional to the square root $T^{1/2}$ of the temperature T.

Finally, a raised gas pressure also has a similar effect. Here, the variation in internal pressure is directly proportional to the rise in pressure.

After storage with the selected boundary conditions, that is to say at the end of the period t, the second zero value $c_{n2} = -k_1 p_0' + k_0$ already mentioned is measured for each absolute pressure sensor, and the individual value of $\delta c_n/c_{sp}$, belonging to each absolute pressure sensor is formed. This value of $\delta c_n/c_{sp}$ is compared with the value $F_n/c_{sp}$ which is the zero-point measuring error $F_n$ of the capacitance zero-point measuring device divided by the measured-value span $c_{sp}$.

The zero-point long-term stability defect classes are formed with the aid of a minimum value prescribable by the user with a safety clearance above the value $F_n/c_{sp}$. It is expedient for this minimum value to be selected to be at least twice, in particular four times, as large as the value $F_n/c_{sp}$.

The defect classes can be distinguished from one another by integral multiples of the minimum value, for example. Here, absolute pressure sensors belonging to higher ones of the defect classes defined in such a way have increasingly worse zero-point long-term stabilities.

As investigations and calculations of the inventors have shown, in measuring the zero-point the measurement uncertainty referred to the measured-value span, denoted below as the relative measurement uncertainty, is composed of the following components a), b), c) and d):

a) of the relative measurement uncertainty owing to the repeated installation and removal of the individual absolute pressure sensor in and from a measuring holder of the capacitance zero-point measuring device, b) of the relative measurement uncertainty owing to variations in ambient temperature, c) of the relative measurement uncertainty owing to the admittedly extremely slight but still finite residual vacuum pressure inside the measuring holder for the absolute pressure sensors, and d) of the negligible relative measurement uncertainty of the capacitance zero-point measurement device.

A maximum value of 0.095% was determined for component a), a maximum value of 0.065% for component b), and a maximum value of 0.015% for component c). The measurement uncertainty referred to the measured-value span is thus yielded theoretically as at most 0.18%. It was established by measurements that it even amounts to only at most 0.12%.

According to the second variant of the invention, at least two different temperature values $T_1$, $T_2$ prescribable by the user, of which one is the room temperature, in particular, and under a vacuum, that is to say $p \rightarrow 0$—which corresponds to $p \approx 0$— a first value $Tk_{c1}$ of the temperature coefficient $Tk_c$ of the zero-point is initially determined, specifically $Tk_{c1} = (C_{p2} \cdot C_{r1} - C_{p1} \cdot C_{r2})/\{C_{p2} \cdot C_{p1}(T_2-T_1)\}_{p=p0}$. In this equation, indices 1, 2 denote the respective measured pressure values of $C_p$, $C_r$ at the two temperature values $T_1$, $T_2$.

According to Gay-Lussac's law, in the case of temperature variations it holds for the temperature-dependent internal pressure $p_0(T)$ of the absolute pressure sensors that: $p_0(T) = \{1 + \alpha(T-T_0)\} \cdot p_0(T_0)$, the index 0 marking the corresponding values for a reference temperature, in particular room temperature, and $\alpha \approx 0.004$ $K^{-1}$ being the cubic coefficient of thermal expansion for gases.

The gradient $dp_0(T)/dT$ of this function is therefore: $dp_0(T)/dT = \alpha \cdot p_0(T)$. On the other hand, it holds for the gradient $dc(p)/dp$ of the above function of pressure dependence of the zero-point $c = k_1(p-p_0) + k_0$ that: $dc(p)/dp = -k_1$.

A measurement of the temperature coefficient $Tk_{c2}$ at a later instant $t_2$ at a leaky absolute pressure sensor yields $Tk_{c2} = Tk_{c1} + \delta Tk_c$. It follows for $\delta Tk_c$ from the above two equations $dp_0(T)/dT = \alpha \cdot p_0(T)$ and $dc(p)/dp = -k_1$ that: $\delta Tk_c = -k_1 \cdot \alpha \cdot \delta p$. The corresponding term divided by the measured-value span defined above is then: $\delta Tk_c/c_{sp} = -(\alpha \cdot \delta p)/pn$.

Substituting the above value 0.004 $K^{-1}$ for $\alpha$ yields a value $Tk_c/c_{sp} = 0.04\% / 100$ K $= 4 \cdot 10^{-4} \% \cdot K^{-1}$ for a 0.1% variation of internal pressure caused by leakiness.

Consequently, in the case of the second variant of the invention as well, at the end of a period t the temperature coefficient $Tk_c$ is measured anew by means of the same capacitance zero-point temperature coefficient measurement device and at the same, at least two temperature values $T_1$, $T_2$ as in the case of the first measurement, and in the case of leaky absolute pressure sensors this therefore yields a second value $Tk_{c2}$ of the temperature coefficient of the zero-point which deviates from the above first value $Tk_{c1}$. It holds for the second value that:

$$Tk_{c2} = (C_{p2} \cdot C_{r1} - C_{p1} \cdot C_{r2})/\{C_{p2} \cdot C_{p1}(T_2-T_1)\}_{p=p0}.$$

If, for example, it is to be possible to guarantee a zero-point long-term stability of <0.1%/a, the absolute value of the difference $\delta Tk_c = Tk_{c1} - Tk_{c2}$, divided by the measured-value span $c_{sp}$, is permitted to be:

$$|\delta Tk_c/c_{sp}| \leq 0.04\%/100K.$$

It is assumed that the two measurements at the above-mentioned instants, specifically at the beginning and at the end of the period t, are affected by the same temperature coefficient measuring error FT of the high-precision capacitance zero-point temperature coefficient measuring device, and thus that the latter's measuring error $F_T$ has remained constant.

This temperature coefficient measuring error $F_T$ is, however, again of the same order of magnitude as the measured term $\delta Tk_c/c_{sp}$; therefore only after the time mentioned at the beginning of at least one year the term $\delta Tk_c/c_{sp}$ has become so large that it differs measurably from the temperature coefficient measuring error $F_T$, that is to say is at least equal to $2 \cdot F_T$, for example.

The following method steps of the second variant of the invention serve to abbreviate this excessively long time, that is to say they serve the purpose permitting the significance of $\delta Tk_c/c_{sp}$ with respect to $F_T$ to appear at a substantially earlier instant.

For this purpose, the absolute pressure sensors are again stored in a gas during a period t, for example by being enclosed in a vessel containing the gas, in such a way that either the pressure and/or the temperature of said gas was raised with respect to normal atmospheric conditions which are, for example, room temperature, air and its normal pressure, or said gas was replaced by another gas with a lower molecular weight.

The lowering of the molecular weight with respect to that of air can be achieved by selecting hydrogen or helium as the gas in which the absolute pressure sensors are stored. Because their molecular weight is lower than that of air, the molecules reach the chamber of the absolute pressure sensors through leaky points more quickly than those of air, with the result that their vacuum worsens more quickly and, therefore $\delta Tk_c/c_{sp}$ reaches significant values more quickly.

The same effect results from storage at a higher temperature than the ambient temperature, since then because of their greater mobility the molecules of the gas penetrate more quickly into leaky points and thus likewise contribute to a quicker worsening of the vacuum in the chamber, attended by the consequences thereof.

After storage with the selected boundary conditions, that is to say at the end of the period t, the second zero value $Tk_{c2}=(C_{p2} \cdot C_{r1} - C_{p1} \cdot C_{r2})/\{C_{p2} \cdot C_{p1}(T_2 - T_1)\}_{p=p0}$, of the temperature coefficient of the zero point, is measured for each absolute pressure sensor, and the individual value of $\delta Tk_c/c_{sp}$, belonging to each absolute pressure sensor is formed. This value of $\delta Tk_c/c_{sp}$ is compared with the value $F_T/c_{sp}$ which is said temperature coefficient measuring error $F_T$ of the capacitance zero-point temperature coefficient measuring device divided by the measured-value span $c_{sp}$.

The zero-point long-term stability defect classes are again formed with the aid of a minimum value prescribable by the user with a safety clearance above the value $F_T/c_{sp}$. It is expedient for this minimum value to be selected to be at least twice, in particular four times, as large as the value $F_T/C_{sp}$.

The defect classes can be distinguished from one another by integral multiples of the minimum value, for example. Here, absolute pressure sensors belonging to higher ones of the defect classes defined in such a way have increasingly worse zero-point long-term stabilities.

We claim:

1. A method for producing capacitive alumina-ceramic absolute pressure sensors sorted in high-precision zero-point long-term stability defect classes which comprises the following steps:

forming a disk-shaped substrate having an annular first electrode near the edge of the substrate and a circular second electrode near the center of the substrate, the first electrode being electrically insulated from the second electrode, forming a diaphragm having a third electrode;

forming an absolute pressure sensor by tightly joining the outer edge of the substrate to the outer edge of the diaphragm using an active brazing ring, a chamber being formed between the substrate and the diaphragm, the first electrode facing the third electrode making a virtually pressure independent reference capacitance, and the second electrode facing the third electrode making a pressure-dependent capacitance;

determining a measured-value span for the absolute pressure sensor;

determining a first zero value for the absolute pressure sensor in a first condition having a first gas at a first temperature and under a near-vacuum pressure using a high-precision capacitance zero-point measuring device having a guaranteed zero-point measuring error;

storing the absolute pressure sensor in a second condition having at least one of a second gas, a second temperature and a second pressure, the second gas having a lower molecular weight than the first gas, the second temperature being greater than normal room temperature, the second pressure being greater than normal atmospheric pressure;

after the storing step, determining a second zero value for the absolute pressure sensor in the first condition using the high-precision capacitance zero-point measuring device;

calculating a pressure sensor ratio by dividing the difference between the first zero value and the second zero value by the measured-value span of the absolute pressure sensor;

calculating a reference ratio by dividing the guaranteed zero-point measuring error of the high-precision capacitance zero-point measuring device by the measured-value span of the absolute pressure sensor;

selecting a minimum value which is greater than the reference ratio;

comparing the pressure sensor ratio to the minimum value; and classifying the absolute pressure sensor into the high-precision zero-point long-term stability defect classes based on the comparison between the pressure sensor ratio and the minimum value.

2. The method of claim 1, wherein the step of forming an absolute pressure sensor by tightly joining the outer edge of the substrate to the outer edge of the diaphragm is performed in a vacuum.

3. The method of claim 1, wherein the step of forming an absolute pressure sensor by tightly joining the outer edge of the substrate to the outer edge of the diaphragm is performed in an inert gas, and the chamber is evacuated.

4. The method of claim 1, wherein the surface area of the first electrode is virtually equal to the surface area of the second electrode.

5. A method for producing capacitive alumina-ceramic absolute pressure sensors sorted in high-precision zero-point long-term stability defect classes which comprises the following steps:

forming a disk-shaped substrate having an annular first electrode near the edge of the substrate and a circular second electrode near the center of the substrate, the first electrode being electrically insulated from the second electrode, forming a diaphragm having a third electrode;

forming an absolute pressure sensor by tightly joining the outer edge of the substrate to the outer edge of the diaphragm using an active brazing ring, a chamber being formed between the substrate and the diaphragm, the first electrode facing the third electrode making a virtually pressure independent reference capacitance, and the second electrode facing the third electrode making a pressure-dependent capacitance;

determining a measured-value span for the absolute pressure sensor;

determining a first zero-point temperature coefficient value for the absolute pressure sensor at a first temperature and a second temperature in a first condition having a first gas under a near-vacuum pressure using a high-precision capacitance zero-point temperature coefficient measuring device having a guaranteed temperature coefficient measuring error, the first temperature being different from the second temperature, one of the first temperature and the second temperature being equal to room temperature;

storing the absolute pressure sensor in a second condition having at least one of a second gas, a raised temperature and a second pressure, the second gas having a lower molecular weight than the first gas, the raised temperature being greater than normal room temperature, the second pressure being greater than normal atmospheric pressure;

after the storing step, determining a second zero-point temperature coefficient value for the absolute pressure sensor at the first temperature and the second temperature in the first condition using the high-precision capacitance zero-point temperature coefficient measuring device;

calculating a pressure sensor ratio by dividing the difference between the first zero-point temperature coefficient value and the second zero-point temperature coefficient value by the measured-value span of the absolute pressure sensor;

calculating a reference ratio by dividing the guaranteed temperature coefficient measuring error of the high-precision capacitance zero-point temperature coefficient measuring device by the measured-value span of the absolute pressure sensor;

selecting a minimum value which is greater than the reference ratio;

comparing the pressure sensor ratio to the minimum value; and classifying the absolute pressure sensor into the high-precision zero-point long-term stability defect classes based on the comparison between the pressure sensor ratio and the minimum value.

6. The method of claim 5, wherein the step of forming an absolute pressure sensor by tightly joining the outer edge of the substrate to the outer edge of the diaphragm is performed in a vacuum.

7. The method of claims 5, wherein the step of forming an absolute pressure sensor by tightly joining the outer edge of the substrate to the outer edge of the diaphragm is performed in an inert gas, and the chamber is evacuated.

8. The method of claim 5, wherein the surface area of the first electrode is virtually equal to the surface area of the second electrode.

* * * * *